United States Patent
Neuvirth et al.

(10) Patent No.: US 12,026,253 B2
(45) Date of Patent: Jul. 2, 2024

(54) DETERMINATION OF LIKELY RELATED SECURITY INCIDENTS

(71) Applicant: Microsoft Technology Licensing, LLC, Redmond, WA (US)

(72) Inventors: Hani Hana Neuvirth, Tel Aviv (IL); Dawn Antonette Burns, Lynnwood, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 336 days.

(21) Appl. No.: 17/477,316

(22) Filed: Sep. 16, 2021

(65) Prior Publication Data
US 2023/0078713 A1 Mar. 16, 2023

(51) Int. Cl.
G06F 21/55 (2013.01)
H04L 9/40 (2022.01)

(52) U.S. Cl.
CPC ........ G06F 21/554 (2013.01); H04L 63/1416 (2013.01); *G06F 2221/034* (2013.01)

(58) Field of Classification Search
CPC ............. G06F 21/554; G06F 2221/034; H04L 63/1416; H04L 41/142; H04L 63/1425; H04L 63/1433; H04L 2463/146
See application file for complete search history.

(56) References Cited

U.S. PATENT DOCUMENTS 11,055,405 B1 * 7/2021 Jin .................. G06F 16/245
11,593,639 B1 * 2/2023 Garg ................ G06F 18/2415
2014/0067734 A1 * 3/2014 Hawkins ................. G06N 7/01
706/58
2018/0139332 A1 * 5/2018 Kerzner ............... H04M 11/045
2019/0207969 A1   7/2019 Brown
2020/0177608 A1   6/2020 Okunlola et al.
2021/0160262 A1 * 5/2021 Bynum .................. H04L 43/16

FOREIGN PATENT DOCUMENTS

CN   113838478 A * 12/2021 ............. G90L 25/51
CN   113965469 A * 1/2022 ............. H04L 41/14

OTHER PUBLICATIONS

"International Search Report and Written Opinion Issued in PCT Application No. PCT/US22/040681", Mailed Date: Dec. 5, 2022, 13 Pages.

* cited by examiner

*Primary Examiner* — Christopher A Revak
(74) *Attorney, Agent, or Firm* — Mannava & Kang, P.C.

(57) ABSTRACT

According to examples, an apparatus may include a processor and a memory on which is stored machine-readable instructions that when executed by the processor, may cause the processor to identify a first set of entities corresponding to a security incident, identify anomalies associated with the first set of entities that occurred around a predefined time period with respect to the incident, identify a second set of entities associated with the identified anomalies, identify a set of incidents that share a common entity from the second set of entities, determine a probability of likelihood that the set of incidents normally share the common entity, determine whether the determined probability of likelihood falls below a predefined threshold, and based on the determined probability of likelihood falling below the predefined threshold, output an indication that the security incident and the set of incidents are likely related.

20 Claims, 4 Drawing Sheets

DETERMINATION OF LIKELY RELATED SECURITY INCIDENTS

BACKGROUND

Applications and/or network hardware may generate event logs and may communicate the event logs to a security information and event management (SIEM) system. The SIEM may facilitate analysis of the event logs to perform security information and event management. For instance, the SIEM may aggregate event data from the applications and/or network hardware to identify anomalies and/or security threats.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Many organizations implement security information and event management (SIEM) systems to identify occurrences of security incidents on their devices and networks. In many instances, the SIEM systems may identify the entities respectively involved in the security incidents. For instance, the SIEM systems may identify that a first particular username and a first particular IP address were involved in a first incident, that a second particular username and a second particular IP address were involved in a second incident, and that a third username and a third particular IP address were involved in a third incident. In this example, the SIEM systems may not determine that the first, second, and, third incidents may be related to each other because none of the entities, e.g., usernames or IP addresses, match each other and thus, may not result in a true positive matching result. However, the first, second, and third incidents may actually be related to each other through some of the entities being commonly involved in other incidents.

Knowledge of incidents that are related to each other may be beneficial for identifying malware attacks as well as for identifying sources and targets of malware attacks. Thus, a technical problem associated with SIEM systems may be that they may fail to accurately identify security incidents that may be related to each other, which may result in reduced identification of malware attacks on an organization's network and devices. This may reduce the level of security on the organization's network and devices and may increase the likelihood of attack.

Disclosed herein are apparatuses, methods, and computer-readable media that may identify security incidents that may be related to each other based on entities that may be involved with common ones of the incidents. Particularly, a processor, as disclosed herein, may identify a first set of entities corresponding to a security incident. The processor may also identify anomalies associated with (e.g., involving) the first set of entities that occurred around a predefined time period with respect to the security incident. For instance, the processor may identify anomalous processes involving the first set of entities.

The processor may further identify a second set of entities associated with (e.g., involving) the identified anomalies. The second set of entities may be greater in number than the first set of entities as there may likely be a greater number of anomalies than security incidents. The processor may also identify a set of incidents, e.g., security incidents, securely-related incidents, etc., that share a common entity from the second set of entities. The processor may still further determine a probability of likelihood that the set of incidents normally share the common entity. In other words, the processor may determine how likely it is that a set of incidents share a common entity.

The processor may determine whether the determined probability of likelihood falls below a predefined threshold and, based on the determined probability of likelihood falling below the predefined threshold, output an indication that the incident and the set of incidents are likely related. Thus, for instance, if it is likely that the set of incidents normally share the common entity, then, determining that the security incident and the set of incidents may be related may not be of value. Instead, it may be of more value to know when it is not likely that the set of incidents normally share the common entity. As such, the processor may output the indication when this occurs.

Through implementation of the features of the present disclosure, a processor may determine when seemingly unrelated incidents, e.g., security-related incidents, may likely be related each other. In addition, the processor may output a notification regarding the potentially related incidents to, for instance, an analyst who may use that information to determine that an attack may be underway as well as to determine a scale of the attack. Implementation of the features of the present disclosure may thus provide the technical improvement of improved threat detection and mitigation on the devices on a network.

Figure 1:
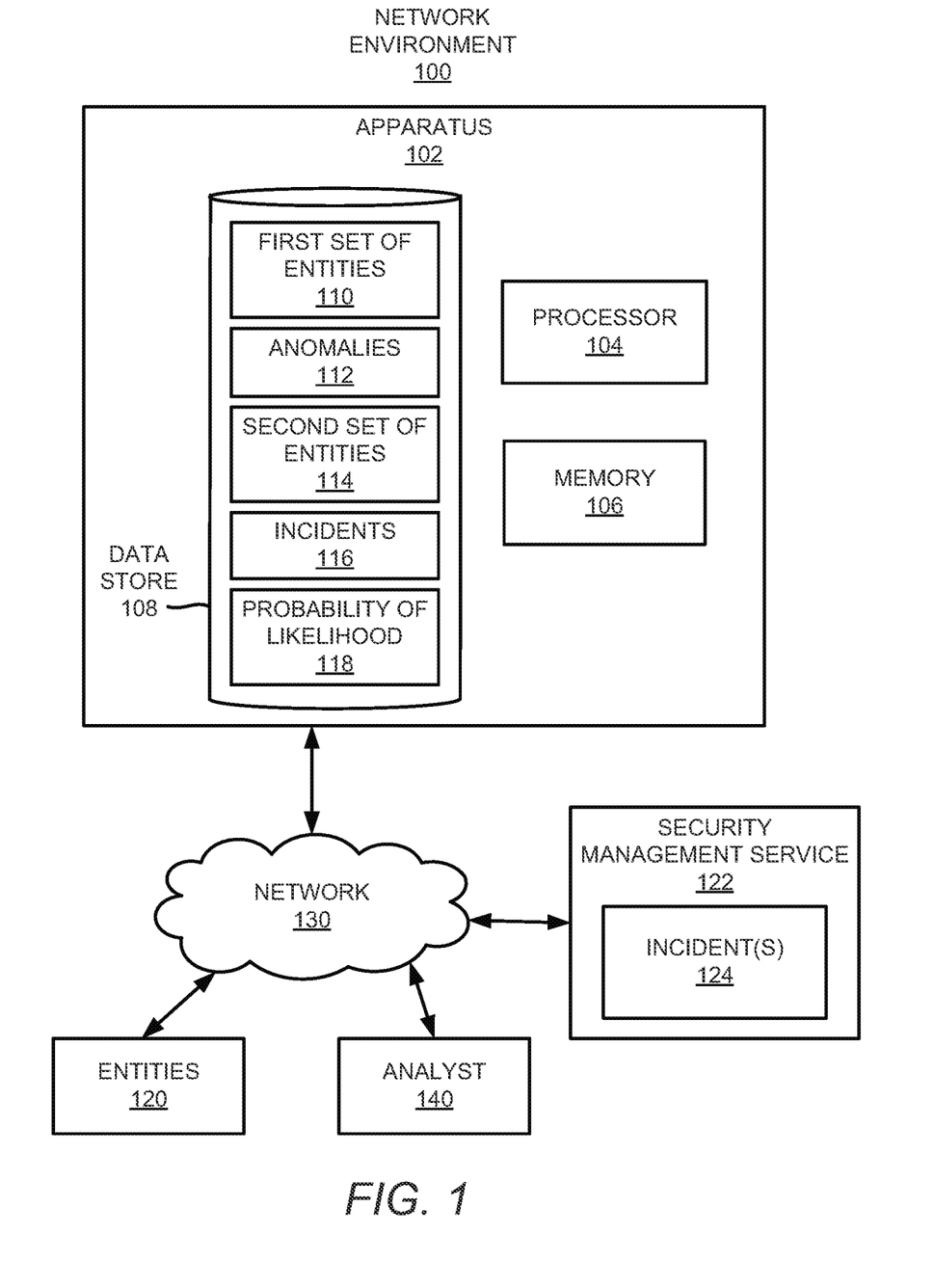
FIG. 1 shows a block diagram of a network environment, in which an apparatus may identify and report on security incidents that may likely be related to each other, in accordance with an embodiment of the present disclosure.
Figure 2:
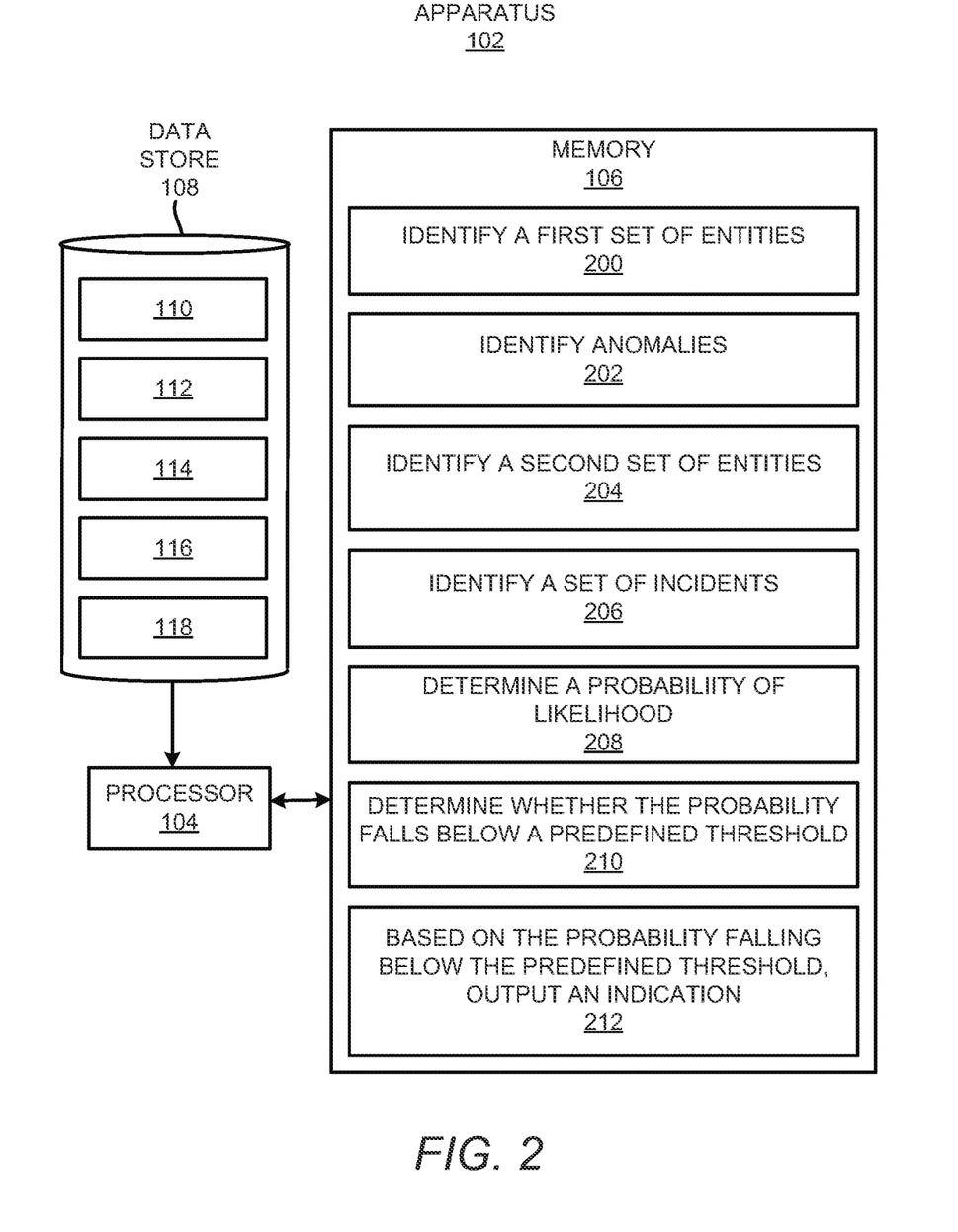
FIG. 2 depicts a block diagram of the apparatus depicted in FIG. 1, in accordance with an embodiment of the present disclosure.

Reference is first made to FIGS. 1 and 2. FIG. 1 shows a block diagram of a network environment 100, in which an apparatus 102 may identify and report on incidents that may likely be related to each other, in accordance with an embodiment of the present disclosure. FIG. 2 depicts a block diagram of the apparatus 102 depicted in FIG. 1, in accordance with an embodiment of the present disclosure. It should be understood that the network environment 100 and the apparatus 102 may include additional features and that some of the features described herein may be removed and/or modified without departing from the scopes of the network environment 100 and/or the apparatus 102.

As discussed in greater herein, the apparatus 102 may identify security incidents that may be related to each other and may output an indication that the incidents are related to each other. That is, the apparatus 102 may determine incidents that have common entities with respect to each other and may determine a probability of likelihood that the incidents share the common entities. The apparatus 102 may also determine whether the probability of likelihood falls below a predefined threshold. Based on a determination that the probability of likelihood exceeds the predefined threshold, the apparatus 102 may determine that the incidents are likely not related to each other. However, based on a determination that the probability of likelihood falls below the predefined threshold, the apparatus 102 may determine that the incidents are likely related to each other. Based on this determination, the apparatus 102 may output an indication of the likely related incidents such that an analyst may verify whether the incidents are related. In this regard, the incidents may be analyzed together to determine patterns, which may assist in the identification and/or corrections of the incidents.

As shown in FIG. 1, the network environment 100 may include, among other things, the apparatus 102, a plurality of entities 120, a security management service 122, a network 130, and an analyst 140. The apparatus 102 may be any type of computing device such as a server, a laptop computer, a desktop computer, a tablet computer, and/or the like. In some examples, the apparatus 102 may be part of the security management service 122. In addition or in other examples, the functionalities of and/or operations that the apparatus 102 may perform may be distributed across multiple servers, multiple virtual machines, and/or the like, on the cloud.

Generally speaking, the entities 120 may be any attribute or object that may be associated with an anomaly, e.g. any attribute or object that may be compared to relevant attributes or objects in other anomalies. For instance, the entities 120 may each be an individual, device, address, socket, files, ports, authentication methods, and/or the like that may access, communicate, or otherwise process data through and/or within the network environment 100. The data may be, for instance, email communications, uploaded and/or downloaded data within the network environment 100, and/or the like. By way of example, the entities 120 may be members of an organization, such as users of computing devices within the organization. The organization may be a company, an institution, an educational institution, and/or the like. The entities 120 may additionally or in other examples be internet protocol (IP) addresses, workstations, network appliances, servers, data storage devices, combinations thereof, and/or the like. The network appliances may be network gateways, hubs, switches, access points, and/or the like.

The security management service 122 may include a server or a group of servers that may be in the cloud or on the premises of an organization to which the entities 120 belong, exist, are used, etc. In addition, the security management service 122 may perform various security management functions with respect to communications within and through the network environment 100. For instance, the security management service 122 may perform security information management services, security event management services, and/or the like. The security management service 122 may collect and aggregate relevant information corresponding to processes, e.g., data communications, data storage operations, malware detection operations, events and event identifiers, database events, network events, access to websites, and/or the like, occurring within or through the network environment 100. The security management service 122 may gather event and log data from users, applications, security devices and/or services, and/or the like.

The relevant information may include identification of the entities 120 that correspond to the communication of the data. For instance, the relevant information may include the identifications of the senders and receivers (e.g., users) of the data, the IP addresses of the computing devices that sent and received of the data, the network switches and/or ports of the network switches through which the data was communicated, the dates and times at which the data was communicated, the identification of a workstation from which the data was communicated, a data storage device to which the data is stored, and/or the like.

The security management service 122 may also aggregate the collected relevant information and may identify occurrences of deviations from norms from the aggregated relevant information. For instance, the security management service 122 may compare collected relevant information with historical data to determine whether a certain process is abnormal or is an incident. By way of particular example, the security management service 122 may employ artificial intelligence techniques to determine whether a certain process is abnormal or is an incident.

An abnormal process may be defined as a process that deviates from a normal process, e.g., as determined through a comparison with historical data. By way of example, if a certain user normally sends emails to 10 other users over a given length of time and then the user sends emails to 1000 users over a similar length of time, the security management service 122 may determine those processes to be abnormal. As another example, the security management service 122 may determine that a process is abnormal if an exceedingly greater amount of data is communicated from a certain IP address than is normal.

An incident, which is also referenced herein as a security incident, may be defined as a process that has a security context. For instance, an incident may be a certain process that is known to be malicious as identified by anti-malware software, a firewall, and/or the like. By way of example, the security management service 122 may determine that an incident has occurred when the security management service 122 receives an indication from an antivirus filter or firewall that a malicious activity has occurred. As another example, the security management service 122 may determine that an incident has occurred when the security management service 122 receives an indication from a directory service of an organization that a certain number of failed login attempts have been made.

As shown in FIGS. 1 and 2, the apparatus 102 may include a processor 104 that may control operations of the apparatus 102. The apparatus 102 may also include a memory 106 on which instructions that the processor 104 may access and/or may execute may be stored. In addition, the processor 104 may include a data store 108 on which the processor 104 may store various information. The processor 104 may be a semiconductor-based microprocessor, a central processing unit (CPU), an application specific integrated circuit (ASIC), a field-programmable gate array (FPGA), and/or other hardware device. The memory 106, which may also be termed a computer readable medium, may be, for example, a Random Access memory (RAM), an Electrically Erasable Programmable Read-Only Memory (EEPROM), a storage device, or the like. The memory 106 may be a non-transitory computer readable storage medium, where the term "non-transitory" does not encompass transitory propagating signals. In any regard, the memory 106 may have stored thereon machine-readable instructions that the processor 104 may execute. The data store 108 may also be a Random Access memory (RAM), an Electrically Erasable Programmable Read-Only Memory (EEPROM), a storage device, or the like.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and/or multiple memories 106. In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 may be distributed across multiple apparatuses 102 and/or multiple processors 104.

As shown in FIG. 2, the memory 106 may have stored thereon machine-readable instructions 200-212 that the processor 104 may execute. Although the instructions 200-212 are described herein as being stored on the memory 106 and may thus include a set of machine-readable instructions, the apparatus 102 may include hardware logic blocks that may perform functions similar to the instructions 200-212. For instance, the processor 104 may include hardware components that may execute the instructions 200-212. In other examples, the apparatus 102 may include a combination of instructions and hardware logic blocks to implement or execute functions corresponding to the instructions 200-212. In any of these examples, the processor 104 may implement the hardware logic blocks and/or execute the instructions 200-212. As discussed herein, the apparatus 102 may also include additional instructions and/or hardware logic blocks such that the processor 104 may execute operations in addition to or in place of those discussed above with respect to FIG. 2.

The processor 104 may execute the instructions 200 to identify a first set of entities 110 corresponding to a security incident 124. In some examples, the processor 104 may receive an indication that the security incident 124 has occurred from the security management service 122. The processor 104 may also receive the identities of the first set of entities 110 from the security management service 122. That is, the security management service 122 may identify that an incident 124, which may be a security event or incident, had occurred and may identify the entities 120 corresponding to the incident 124. The security management service 122 may identify the incident 124 and the entities 120 corresponding to the incident 124 from an analysis of aggregated data as discussed herein. In addition, the security management service 122 may communicate the indication of the incident 124 and the identification of the first set of entities 110 to the apparatus 102.

For instance, the security management service 122 may communicate the indication of the incident 124 and the identification of the first set of entities 110 to the apparatus 102 via the network 130. In instances in which the apparatus 102 is separate from the security management service 122, the network 130 may be an internal network, such as a local area network, or an external network, such as the Internet. In other instances in which the apparatus 102 is part of the security management service 122, the network 130 may be an internal network, a network bus, and/or the like.

The processor 104 may execute the instructions 202 to identify anomalies 112 associated with the first set of entities 110 that occurred around a predefined time period with respect to the incident 124. The predefined time period with respect to the incident 124 may be, for instance, around one day prior to the incident 124, around two days prior to the incident 124, and/or the like. In some examples, the security management service 122 may identify the anomalies 112 through analysis of information included in event logs. In these examples, the security management service 122 may communicate the identified anomalies 112 to the apparatus 102. In other examples, the processor 104 may identify the anomalies 112 through analysis of information included in event logs.

The processor 104 may execute the instructions 204 to identify a second set of entities 114 associated with the identified anomalies 112. In some examples, the processor 104 may identify processes associated with the first set of entities 110 around the predefined time period. As discussed herein, the processes may be data communications, data storage operations, malware detection operations, and/or the like, occurring within or through the network environment 100. In these examples, the processor 104 may determine whether any of the identified processes are anomalous with respect to predefined normal behaviors of the identified processes. The predefined normal behaviors of the identified processes may be determined based on historical data corresponding to a certain time period prior to occurrence of the incident 124. By way of example, the processor 104 and/or the security management service 122 may determine the predefined normal behaviors through implementation of any suitable technique, such as artificial intelligence techniques, historical data analysis, and/or the like, in addition, the certain time period may be one month, two months, one quarter, and/or the like prior to the occurrence of the incident 124.

The processor 104 may identify the processes that are determined to be anomalous and may identify entities 120 associated with the anomalous processes as the second set of entities 114. The entities 120 associated with the anomalous processes may be those entities 120 that sent and/or received (e.g., users) data, the IP addresses of the computing devices that sent and received of the data, the network switches and/or ports of the network switches through which the data was communicated, the identification of a workstation from which the data was communicated, a data storage device to which the data is stored, and/or the like.

The processor 104 may execute the instructions 206 to identify a set of incidents 116 that share a common entity 120 from the second set of entities 114. That is, the processor 104 may identify other incidents 124 that have occurred over some predefined time period, such as over a past week, over a past month, or the like, and may determine whether any of the entities 120 in the second set of entities 114 were involved in the set of incidents 116. In addition, the processor 104 may determine whether any of the identified incidents 124 involve common entities 120 from the second set of entities 114. For instance, the processor 104 may determine that an identified incident 124 involved the same user, the same IP addresses, and/or the like.

The processor 104 may execute the instructions 208 to determine a probability of likelihood 118 that the set of incidents 116 that share a common entity 120 from the second set of entities 114 normally share the common entity 120. The processor 104 may determine the probability of likelihood 118 that the set of incidents 116 normally share the common entity 120 from historical data pertaining to correlations between incidents 124 and entities 120. For instance, the processor 104 may determine a frequency at which the incidents 124 involve the same entities 120 over some time period and the processor 104 may determine the probability of likelihood 118 based on the determined frequency. Thus, the greater the frequency, the higher the probability of likelihood 118.

The processor 104 may execute the instructions 210 to determine whether the probability of likelihood 118 falls below a predefined threshold. The predefined threshold may be user-defined and may be based on, for instance, an intended level of security. That is, the predefined threshold may be set to a higher level to capture a larger number of incidents involving the same or common entities 120, which may, however, result in a larger number of false positives. Similarly, the predefined threshold may be set to a lower level to reduce the number of false positives, which may, however, result in missed true positives. By way of particular examples, the predefined threshold may be set to be around 10% or lower.

The processor 104 may execute the instructions 212 to, based on the determined probability of likelihood 118 falling below the predefined threshold; output an indication that the incident 124 and the set of incidents 116 are likely related to each other. The processor 104 may also output additional information, such as the entity 120 or entities 120 to which the incident 124 and the set of incidents 116 may be related. Particularly, the processor 104 may output the indication to an analyst 140 via the network 130 such that the analyst 140 may analyze the incident 124 and the set of incidents 116 to verify whether the incident 124 and the set of incidents 116 are related. The analyst 140 may also cause other actions, such as mitigation and/or corrective actions, to be performed based on the analysis.

According to examples, the processor 104 may identify a second set of incidents 116 that share a second common entity 120 from the second set of entities 114. In these examples, the processor 104 may determine a second probability of likelihood 118 that the second set of incidents 116 normally share the second common entity 120. The processor 104 may also determine whether the determined second probability of likelihood 118 falls below the predefined threshold. In addition, based on the determined second probability of likelihood 118 falling below the predefined threshold, the processor 104 may output an indication that the incident 124 and the second set of incidents 116 are likely related. The processor 104 may also output the entity 120 or entities 120 to which the incident 124 and the second set of incidents 116 may be related.

According to examples, the processor 104 may identify a plurality of sets of incidents 116 that share respective common entities 120 from the second set of entities 114. In these examples, the processor 104 may determine probabilities of likelihood 118 that the plurality of sets of incidents 116 normally share the respective common entities 120. The processor 104 may also determine which of the plurality of sets of incidents 116 that share the respective common entities 120 have probabilities of likelihood 118 that fall below the predefined threshold. In addition, the processor 104 may output an indication of the plurality of sets of incidents 116 and respective common entities 120 that have probabilities of likelihood that fall below the predefined threshold.

Figure 3:
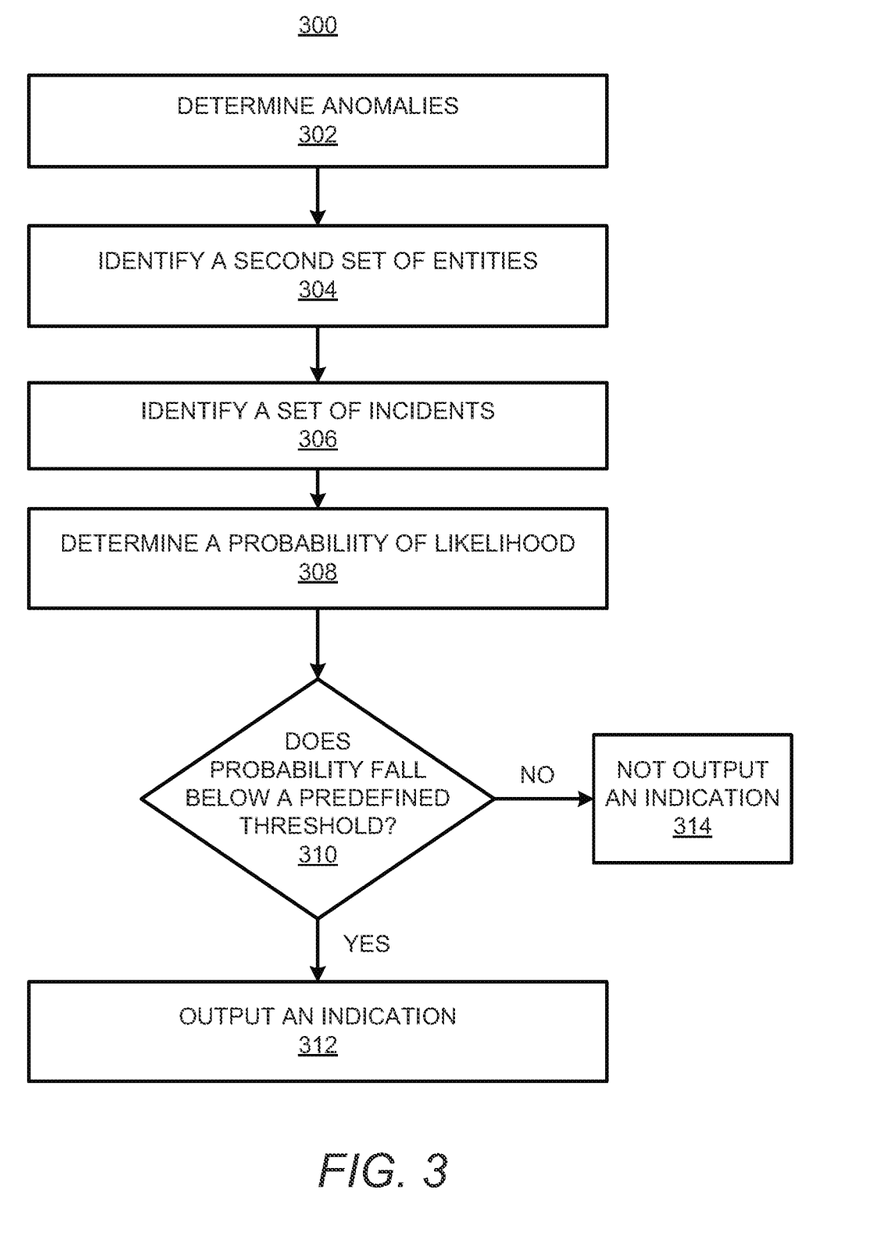
FIG. 3 depicts a flow diagram of a method for identifying security incidents that may likely be related to each other and for outputting an indication of the identified security incidents, in accordance with embodiments of the present disclosure.

Various manners in which the processor 104 of the apparatus 102 may operate are discussed in greater detail with respect to the method 300 depicted in FIG. 3. Particularly, FIG. 3 depicts a flow diagram of a method 300 for identifying security-related incidents 116, 124 that may likely be related to each other and for outputting an indication of the identified security-related incidents 116, 124, in accordance with an embodiment of the present disclosure. It should be understood that the method 300 may include additional operations and that some of the operations described therein may be removed and/or modified without departing from the scope of the method 300. The descriptions of the method 300 is made with reference to the features depicted in FIGS. 1 and 2 for purposes of illustration.

At block 302, the processor 104 may determine anomalies associated with a first set of entities 110 corresponding to a security-related incident 124, in which the anomalies occurred within a predefined time period with respect to occurrence of the security-related incident 124. Particularly, for instance, the processor 104 may have received an indication that the security incident 124 has occurred from a security management service 122. Additionally, the processor 104 may have received the identities of the first set of entities 110 corresponding to the security-related incident 124, e.g., involved in the security-related incident 124, from the security management service 122. The processor 104 may determine the anomalies based on the received indication of the security-related incident 124 and the received identities of the first set of entities 110.

For instance, the processor 104 may identify processes associated with the first set of entities 110 within the predefined time period. The processor 104 may also determine whether any of the identified processes are anomalous with respect to predefined normal behaviors. In some examples, the processor 104 may determine the predefined normal behaviors from historical data corresponding to a certain time period prior to the determination that the security-related incident 124 has occurred. In addition, the processor 104 may identify the processes that are determined to be anomalous to identify the anomalies associated with the first set of entities 110. For instance, the processor 104 may identify the anomalous processes as being the anomalies.

At block 304, the processor 104 may identify a second set of entities 114 associated with the determined anomalies. In other words, the processor 104 may identify a second set of entities 114 that were involved with the determined anomalies. At block 306, the processor 104 may identify a set of incidents 116 that share a common entity 120 with respect to each other from the second set of entities 114.

At block 308, the processor 104 may determine a probability of likelihood 118 that the common entity 120 is normally associated with the set of incidents 116. The processor 104 may determine the probability of likelihood that the set of incidents 116 normally share the common entity 120 from historical data pertaining to correlations between incidents 124 and entities 120. At block 310, the processor 104 may determine whether the probability of likelihood 118 falls below a predefined threshold. In addition, at block 312, the processor 104 may, based on the probability of likelihood 118 falling below the predefined threshold, output an indication that the security-related incident 124 and the set of incidents 116 are likely related. However, at block 314, the processor 104 may, based on the probability of likelihood 118 exceeding the predefined threshold, not output an indication that the security-related incident 124 and the set of incidents 116 are likely related.

According to examples, the processor 104 may identify a plurality of sets of incidents 116 that share respective common entities 120 with respect to each other from the second set of entities 114. The processor 104 may determine probabilities of likelihood 118 that the plurality of sets of incidents 116 normally share the respective common entities 120. In addition, the processor 104 may determine which of the plurality of sets of incidents 116 that share the respective common entities 120 have probabilities of likelihood 118 that fall below the predefined threshold. Moreover, the processor 104 may output an indication of the plurality of sets of incidents 116 and respective common entities 120 that have probabilities of likelihood 118 that fall below the predefined threshold.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 4:
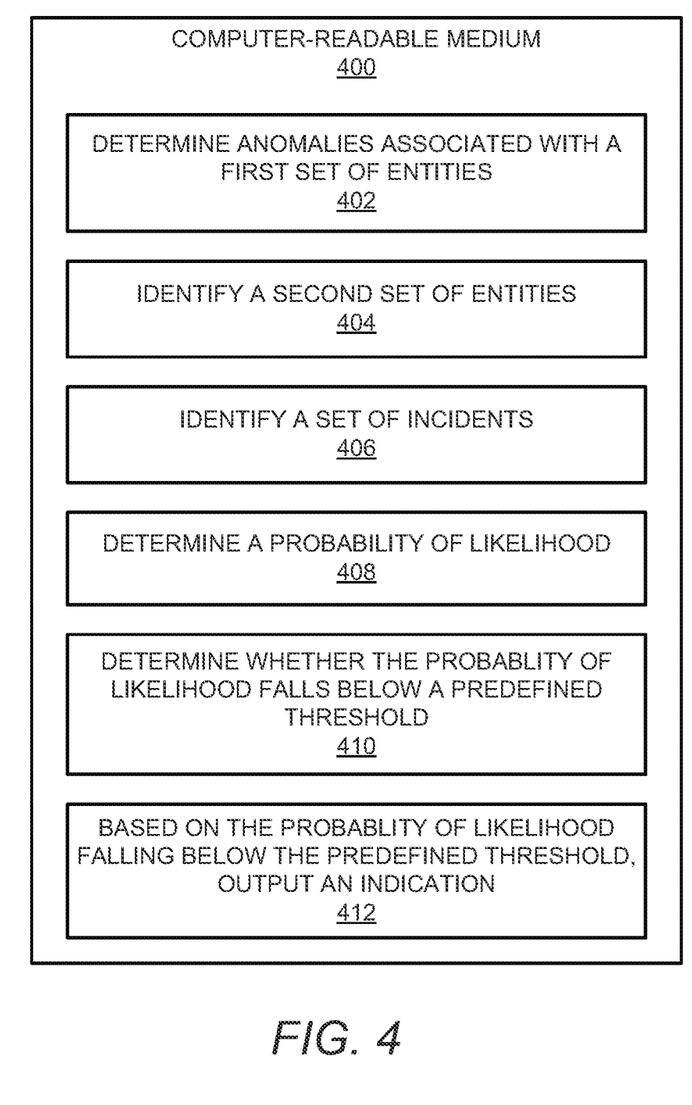
FIG. 4 shows a block diagram of a computer-readable medium that may have stored thereon computer-readable instructions for identifying incidents that may likely be related to each other and for outputting an indication of the identified incidents, in accordance with an embodiment of the present disclosure.

Turning now to FIG. 4, there is shown a block diagram of a computer-readable medium 400 that may have stored thereon computer-readable instructions for identifying incidents 116, 124 that may likely be related to each other and for outputting an indication of the identified incidents 116, 124, in accordance with an embodiment of the present disclosure. It should be understood that the computer-readable medium 400 depicted in FIG. 4 may include additional instructions and that some of the instructions described herein may be removed and/or modified without departing from the scope of the computer-readable medium 400 disclosed herein. The computer-readable medium 400 may be a non-transitory computer-readable medium, in which the term "non-transitory" does not encompass transitory propagating signals.

The computer-readable medium 400 may have stored thereon computer-readable instructions 402-412 that a processor, such as a processor 104 of the apparatus 102 depicted in FIGS. 1 and 2, may execute. The computer-readable medium 400 may be an electronic, magnetic, optical, or other physical storage device that contains or stores executable instructions. The computer-readable medium 400 may be, for example, Random Access memory (RAM), an Electrically Erasable Programmable Read-Only Memory (EEPROM), a storage device, an optical disc, and the like.

The processor may fetch, decode, and execute the instructions 402 to determine anomalies associated with a first set of entities 110 corresponding to an incident 124. The anomalies may have occurred within a predefined time period with respect to occurrence of the incident 124. The processor may receive an indication that the incident 124 has occurred and the identities of the first set of entities 110 corresponding to the incident from a security management service 122. In addition, the processor may identify processes associated with the first set of entities 110 within the predefined time period. The processor may also determine whether any of the identified processes are anomalous with respect to predefined normal behaviors and identify the processes that are determined to be anomalous to identify the anomalies associated with the first set of entities 110.

The processor may fetch, decode, and execute the instructions 404 to identify a second set of entities 114 associated with the determined anomalies. The processor may fetch, decode, and execute the instructions 406 to identify a set of incidents 116 that share a common entity 120 with respect to each other from the second set of entities 114. The processor may fetch, decode, and execute the instructions 408 to determine a probability of likelihood 118 that the common entity 120 is normally associated with the set of incidents 116. The processor may fetch, decode, and execute the instructions 410 to determine whether the probability of likelihood 118 falls below a predefined threshold. The processor may fetch, decode, and execute the instructions 412 to, based on the probability of likelihood falling below the predefined threshold, output an indication that the incident and the set of incidents are likely related.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
    a processor; and
    a memory on which is stored machine-readable instructions that when executed by the processor, cause the processor to:
      identify a first set of entities corresponding to a particular security incident;
      identify anomalies associated with the first set of entities that occurred around a predefined time period with respect to the particular security incident;
      identify a second set of entities associated with the identified anomalies;
      identify a set of incidents that share a common entity from the second set of entities;
      determine a probability of likelihood that the set of incidents share the common entity from historical data pertaining to correlations between incidents in the set of incidents and entities in the second set of entities;
      determine whether the determined probability of likelihood that the set of incidents share the common entity falls below a predefined threshold; and based on the determined probability of likelihood that the set of incidents share the common entity falling below the predefined threshold, output an indication that the particular security incident and the set of incidents are likely related.

2. The apparatus of claim 1, wherein the instructions further cause the processor to:
identify a second set of incidents that share a second common entity from the second set of entities;
determine a second probability of likelihood that the second set of incidents share the second common entity;
determine whether the determined second probability of likelihood falls below the predefined threshold; and
based on the determined second probability of likelihood falling below the predefined threshold, output an indication that the particular security incident and the second set of incidents are likely related.

3. The apparatus of claim 1, wherein the instructions cause the processor to:
receive an indication that the particular security incident has occurred from a security management service; and
receive identities of the first set of entities corresponding to the particular security incident from the security management service to identify the first set of entities corresponding to the particular security incident.

4. The apparatus of claim 1, wherein the instructions cause the processor to:
determine the probability of likelihood that the set of incidents share the common entity from historical data pertaining to correlations between incidents and entities.

5. The apparatus of claim 1, wherein the particular security incident and the set of incidents comprise security contexts.

6. The apparatus of claim 1, wherein the entities comprise users, internet protocol addresses, workstations, network appliances, servers, data storage devices, or combinations thereof.

7. The apparatus of claim 1, wherein the instructions cause the processor to:
identify processes associated with the first set of entities around the predefined time period;
determine whether any of the identified processes are anomalous with respect to predefined normal behaviors of the identified processes;
identify the processes that are determined to be anomalous; and
identify entities associated with the anomalous processes as the second set of entities.

8. The apparatus of claim 7, wherein the predefined normal behaviors of the identified processes are determined from historical data corresponding to a certain time period prior to occurrence of the particular security incident.

9. The apparatus of claim 1, wherein the instructions cause the processor to:
identify a plurality of sets of incidents that share respective common entities from the second set of entities;
determine probabilities of likelihood that the plurality of sets of incidents share the respective common entities;
determine which of the plurality of sets of incidents that share the respective common entities have probabilities of likelihood that fall below the predefined threshold; and
output an indication of the plurality of sets of incidents and respective common entities that have probabilities of likelihood that fall below the predefined threshold.

10. A method comprising:
determining, by a processor, anomalies associated with a first set of entities corresponding to a particular security-related incident, wherein the anomalies occurred within a predefined time period with respect to occurrence of the particular security-related incident;
identifying, by the processor, a second set of entities associated with the determined anomalies;
identifying, by the processor, a set of incidents that share a common entity with respect to each other from the second set of entities;
determining, by the processor, a probability of likelihood that the common entity is associated with the set of incidents from historical data pertaining to correlations between incidents in the set of incidents and entities in the second set of entities;
determining, by the processor, whether the probability of likelihood that the common entity is associated with the set of incidents falls below a predefined threshold; and
based on the probability of likelihood that the common entity is associated with the set of incidents falling below the predefined threshold, outputting an indication that the particular security-related incident and the set of incidents are likely related.

11. The method of claim 10, further comprising:
receiving an indication that the particular security-related incident has occurred from a security management service; and
receiving identities of the first set of entities corresponding to the particular security-related incident from the security management service.

12. The method of claim 10, further comprising:
identifying a plurality of sets of incidents that share respective common entities with respect to each other from the second set of entities;
determining probabilities of likelihood that the plurality of sets of incidents share the respective common entities;
determining which of the plurality of sets of incidents that share the respective common entities have probabilities of likelihood that fall below the predefined threshold; and
outputting an indication of the plurality of sets of incidents and respective common entities that have probabilities of likelihood that fall below the predefined threshold.

13. The method of claim 10, further comprising:
identifying processes associated with the first set of entities within the predefined time period;
determining whether any of the identified processes are anomalous with respect to predefined normal behaviors; and
identifying the processes that are determined to be anomalous to identify the anomalies associated with the first set of entities.

14. The method of claim 13, further comprising:
determining the predefined normal behaviors from historical data corresponding to a certain time period prior to the determination that the particular security-related incident has occurred.

15. The method of claim 10, further comprising:
determining the probability of likelihood that the set of incidents share the common entity from historical data pertaining to correlations between incidents and entities.

16. A computer-readable storage device on which is stored computer-readable instructions that when executed by a processor, cause the processor to:
- determine anomalies associated with a first set of entities corresponding to a particular incident, wherein the determined anomalies occurred within a predefined time period with respect to occurrence of the particular incident;
- identify a second set of entities associated with the determined anomalies;
- identify a set of incidents that share a common entity with respect to each other from the second set of entities;
- determine a probability of likelihood that the common entity is associated with the set of incidents from historical data pertaining to correlations between incidents in the set of incidents and entities in the second set of entities;
- determine whether the probability of likelihood that the common entity is associated with the set of incidents falls below a predefined threshold; and
- based on the probability of likelihood that the common entity is associated with the set of incidents falling below the predefined threshold, output an indication that the particular incident and the set of incidents are likely related.

17. The computer-readable storage device of claim 16, wherein the instructions further cause the processor to:
- receive an indication that the particular incident has occurred from a security management service; and
- receive identities of the first set of entities corresponding to the particular incident from the security management service.

18. The computer-readable storage device of claim 16, wherein the instructions further cause the processor to:
- identify a plurality of sets of incidents that share respective common entities with respect to each other from the second set of entities;
- determine probabilities of likelihood that the plurality of sets of incidents share the respective common entities;
- determine which of the plurality of sets of incidents that share the respective common entities have probabilities of likelihood that fall below the predefined threshold; and
- output an indication of the plurality of sets of incidents and respective common entities that have probabilities of likelihood that fall below the predefined threshold.

19. The computer-readable storage device of claim 16, wherein the instructions further cause the processor to:
- identify processes associated with the first set of entities within the predefined time period;
- determine whether any of the identified processes are anomalous with respect to predefined normal behaviors; and
- identify the processes that are determined to be anomalous to identify the anomalies associated with the first set of entities.

20. The computer-readable storage device of claim 19, wherein the instructions further cause the processor to:
- determine the predefined normal behaviors from historical data corresponding to a certain time period prior to the determination that the particular incident has occurred.

* * * * *